US008896212B2

(12) United States Patent
Kornitz et al.

(10) Patent No.: US 8,896,212 B2
(45) Date of Patent: Nov. 25, 2014

(54) THERMAL CONTROL CIRCUIT FOR AN ACTIVE COOLING MODULE FOR A LIGHT-EMITTING DIODE FIXTURE

(71) Applicants: Alexander Kornitz, Coquitlam (CA); Mirek Pospisil, West Vancouver (CA)

(72) Inventors: Alexander Kornitz, Coquitlam (CA); Mirek Pospisil, West Vancouver (CA)

(73) Assignee: MP Design Inc., Vancouver (CA)

( * ) Notice: Subject to any disclaimer, the term of this patent is extended or adjusted under 35 U.S.C. 154(b) by 130 days.

(21) Appl. No.: 13/741,055

(22) Filed: Jan. 14, 2013

(65) Prior Publication Data

US 2014/0197735 A1 Jul. 17, 2014

(51) Int. Cl.

| | |
|---|---|
| ***H01J 7/24*** | (2006.01) |
| ***H02H 9/08*** | (2006.01) |
| ***H02H 5/04*** | (2006.01) |
| ***G06F 1/20*** | (2006.01) |
| ***F21V 29/00*** | (2006.01) |

(52) U.S. Cl.
USPC ..... 315/113; 361/93.8; 361/106; 361/679.47; 361/679.54; 362/294; 362/373

(58) Field of Classification Search
CPC ............. H05B 33/0854; H05B 33/089; H01L 2224/48091; H01L 2924/00014; F21Y 2101/02
USPC ......... 315/291, 307, 309, 294, 297, 300, 302, 315/112, 113; 361/93.8, 106, 679.47, 361/679.54; 362/294, 373
See application file for complete search history.

(56) References Cited

U.S. PATENT DOCUMENTS

| | | | | |
|---|---|---|---|---|
| 3,982,163 A | 9/1976 | Hill | | |
| 7,626,346 B2 * | 12/2009 | Scilla | ............................ | 315/309 |
| 8,070,324 B2 * | 12/2011 | Kornitz et al. | ................ | 362/294 |
| 8,754,594 B2 * | 6/2014 | Lenk et al. | .................... | 315/311 |
| 2008/0224634 A1 * | 9/2008 | Scilia | ............................ | 315/294 |
| 2010/0027276 A1 | 2/2010 | Kornitz et al. | | |
| 2011/0068696 A1 * | 3/2011 | van de Ven et al. | ........... | 315/152 |
| 2011/0285324 A1 * | 11/2011 | Kao et al. | ...................... | 315/309 |
| 2012/0061070 A1 | 3/2012 | Kornitz et al. | | |
| 2013/0033179 A1 * | 2/2013 | Lenk et al. | .................... | 315/112 |

* cited by examiner

*Primary Examiner* — Thienvu Tran
(74) *Attorney, Agent, or Firm* — Cameron IP

(57) ABSTRACT

A thermal control circuit comprises a positive temperature coefficient thermistor array, a negative temperature coefficient thermistor array, and a resistor array. The positive temperature coefficient thermistor array and the resistor array are electrically connected in parallel to a first terminal of the thermal control circuitry. The negative temperature coefficient thermistor array is electrically connected to a second terminal of the thermal control circuit. The positive temperature coefficient thermistor array, a negative temperature coefficient thermistor array, and the resistor array are all connected by a negative bus to a third terminal of the thermal control circuit.

16 Claims, 3 Drawing Sheets

THERMAL CONTROL CIRCUIT FOR AN ACTIVE COOLING MODULE FOR A LIGHT-EMITTING DIODE FIXTURE

BACKGROUND OF THE INVENTION

1. Field of the Invention

The present invention relates to an active cooling module and, in particular, to a thermal control circuit for an active cooling module for a light-emitting diode fixture.

2. Description of the Related Art

Light-emitting diodes, like any semiconductor, emit heat during their operation. This is because not all of the electrical energy provided to a light-emitting diode is converted to luminous energy. A significant portion of the electrical energy is converted to thermal energy which results in an increase in the temperature of the light-emitting diode. In resistor driven circuits, as the temperature of the light-emitting diode increases, the forward voltage drops and the current passing through the PN junction of the light-emitting diode increases. The increased current causes additional heating of the PN junction and may thermally stress the light-emitting diode.

Thermally stressed light-emitting diodes lose efficiency and their output is diminished. In certain situations, optical wavelengths may even shift causing white light to appear with a blue tinge. Thermally stressed light-emitting diodes may also impose an increased load on related driver components causing their temperature to increase as well. This may result in broken wire bonds, delaminating, internal solder joint detachment, damage to die-bond epoxy, and lens yellowing. If nothing is done to control the increasing temperature of the light emitting diode, the PN junction may fail, possibly resulting in thermal runaway and catastrophic failure.

Thermal control of light-emitting diodes involves the transfer of thermal energy from the light-emitting diode. Accordingly, one aspect of light-emitting diode fixture design involves efficiently transferring as much thermal energy as possible away from the PN junction of the light-emitting diode. This can generally be accomplished, at least in part, through the use of a heat sink However, for more powerful light-emitting diode fixtures in the 20 to 60 watt range or in applications where numerous light-emitting diodes are disposed within a confined space, an additional cooling means may be required to maintain performance. This is because the thermal energy generated by the light-emitting diodes may at times exceed the thermal energy absorbed and dissipated by the heat sink In these situations a cooling fan is typically used in combination with the heat sink.

In a conventional thermal control system for light-emitting diode fixtures, a heat sink and a cooling fan are thermally coupled to a light source comprised of a plurality of light-emitting diodes. A thermal sensor senses the temperature of the light source and signals a controller to operate a variable speed cooling fan, based on the temperature of the light source, to maintain the fixture within a desired temperature range. However, the need for a controller, typically in the form of a microprocessor, increases the number of components in the thermal control system and thereby increases manufacturing costs.

SUMMARY OF THE INVENTION

There is accordingly provided a thermal control circuit comprising a positive temperature coefficient thermistor array, a negative temperature coefficient thermistor array, and a resistor array. The positive temperature coefficient thermistor array and resistor array are electrically connected in parallel to a first terminal of the thermal control circuit. The negative temperature coefficient thermistor array is electrically connected to a second terminal of the thermal control circuit. The positive temperature coefficient thermistor array, the negative temperature coefficient thermistor array, and the resistor array are all connected by a negative bus to a third terminal of the thermal control circuit. The thermal control circuit may be a package.

There is also provided an active cooling module for a light-emitting diode. The active cooling module comprises a cooling device electrically connected to a power supply. A thermal control circuit is electrically connected to the power supply. The thermal control circuit comprises a positive temperature coefficient thermistor array, a negative temperature coefficient thermistor array, and a resistor array. The positive temperature coefficient thermistor array and resistor array are electrically connected in parallel to a first terminal of the thermal control circuit. The negative temperature coefficient thermistor array is electrically connected to a second terminal of the thermal control circuit. The positive temperature coefficient thermistor array, the negative temperature coefficient thermistor array, and the resistor array are all connected by a negative bus to a third terminal of the thermal control circuit. A negative terminal of the light-emitting diode is electrically connected the first terminal of the thermal control circuit. A negative terminal of the cooling device is electrically connected to the second terminal of the thermal control circuit and a negative terminal of the power supply is electrically connected to the third terminal of the thermal control circuit. The active cooling module may further include a heat sink and the light-emitting diode may be thermally coupled to the heat sink. The thermal control circuit may be mounted on the heat sink The thermal control circuit may be a package. The cooling device may be a fan. The light-emitting diode may be part of an LED array.

There is further provided an electrical device provided with an active cooling module. The electrical device comprises a power supply. A light-emitting diode electrically connected to the power supply. A cooling device and thermal control circuit are also electrically connected to the power supply. The thermal control circuit comprises a positive temperature coefficient thermistor array, a negative temperature coefficient thermistor array, and a resistor array. The positive temperature coefficient thermistor array and resistor array are electrically connected in parallel to a first terminal of the thermal control circuit. The negative temperature coefficient thermistor array is electrically connected to a second terminal of the thermal control circuit. The positive temperature coefficient thermistor array, the negative temperature coefficient thermistor array, and the resistor array are all connected by a negative bus to a third terminal of the thermal control circuit. A negative terminal of the light-emitting diode is electrically connected the first terminal of the thermal control circuit. A negative terminal of the cooling device is electrically connected to the second terminal of the thermal control circuit and a negative terminal of the power supply is electrically connected to the third terminal of the thermal control circuit. The electronic device may further include a printed circuit board and the thermal control circuit may mounted on the printed circuit board. The active cooling module may further include a heat sink and the light-emitting diode may be thermally coupled to the heat sink The thermal control circuit may be mounted on the heat sink. The thermal control circuit may be a package. The cooling device may be a fan. The light-emitting diode may be part of an LED array. The electronic device may be an light-emitting diode of array.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
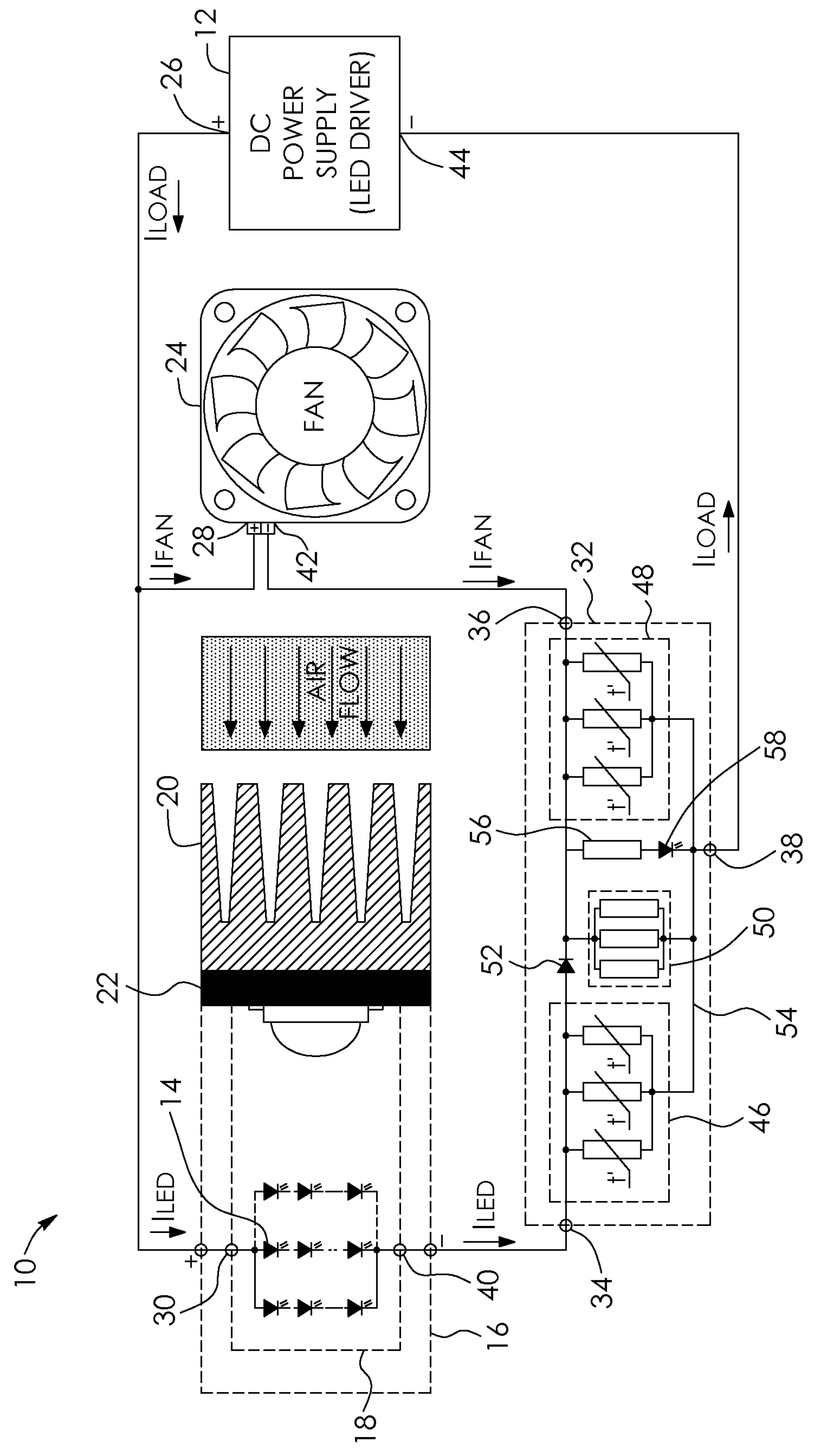
FIG. 1 is a circuit diagram of a light-emitting diode fixture provided with an improved active cooling module having an improved thermal control circuit.

Referring to the drawings and first to FIG. 1 a circuit diagram of a electronic device with a light emitting diode which, in this example, is a light-emitting diode fixture 10 is shown. A driver or DC power supply 12 is connected to a light-emitting diode, for example light-emitting diode 14, mounted on a printed circuit board 16. The light-emitting diode 14 is part of an LED array 18 in which light-emitting diodes may be connected in parallel or series. In this example, the printed circuit board 16 and the LED array 18 are thermally coupled to a heat sink 20 by a thermal interface 22. The DC power supply 12 is also connected to a cooling device which, in this example, is a fan 24. A positive terminal 26 of the DC power supply 12 is electrically connected in parallel to the positive terminal 28 of the fan 24 and a positive terminal 30 of the LED array 18.

There is also a thermal control circuit 32 which has a first terminal 34, a second terminal 36, and a third terminal 38. A negative terminal 40 of the LED array 18 is electrically connected to the first terminal 34 of the thermal control circuit 32. A negative terminal 42 of the fan 24 is electrically connected to the second terminal 36 of the thermal control circuit 32. A negative terminal 44 of the DC power supply 12 is electrically connected to the third terminal 38 of the thermal control circuit 32. The thermal control circuit 32 includes a positive temperature coefficient thermistor array 46 and a negative temperature coefficient thermistor array 48.

Figure 2:
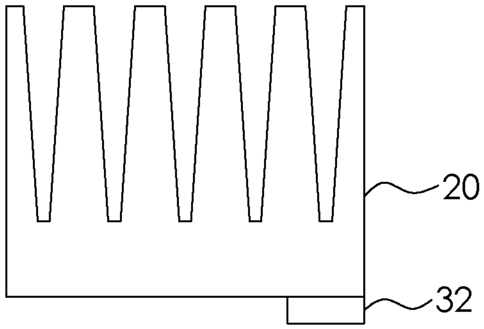
FIG. 2 is a schematic diagram of the thermal control circuit coupled to a heat sink.
Figure 3:
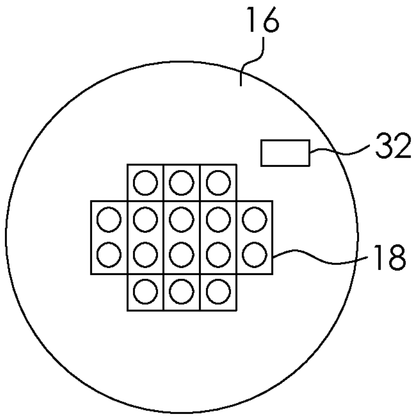
FIG. 3 shows a schematic diagram of the thermal control circuit coupled to a printed circuit board upon which an LED array is mounted.
Figure 4:
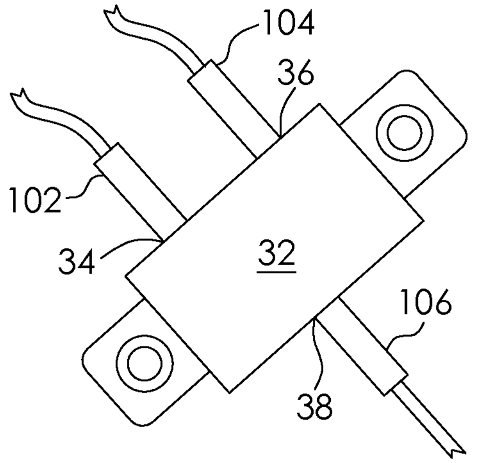
FIG. 4 shows a schematic diagram of a thermal control circuit as an electrical package.

The positive temperature coefficient thermistor array 46 is electrically connected in series between the negative terminal 40 of the LED array 18 and the negative terminal 44 of the DC power supply 12 through the first terminal 34 and the third terminal 38 of the thermal control circuit 32. The positive temperature coefficient thermistor array 46 functions to protect the LED array 18 from overheating and overcurrent. The positive coefficient thermistor array 46 of the thermal control circuit 32 may therefore be coupled to the heat sink 20 or LED array 18 and printed circuit board 16. FIG. 2 shows the thermal control circuit 32 coupled to the heat sink 20. FIG. 3 shows the thermal control circuit 32 coupled to the LED array 18 and printed circuit board 16. FIG. 4 shows the thermal control circuit as a package with wires 102, 104 and 106 connected to the respective terminals 34, 36 and 38 thereof.

Referring back to FIG. 1, the negative temperature coefficient thermistor array 48 is electrically connected in series between the negative terminal 42 of the fan 24 and the negative terminal 44 of the DC power supply 12 through the second terminal 36 and the third terminal 38 of the thermal control circuit 32. The negative temperature coefficient thermistor array 48 is thermally coupled to the heat sink 20 and is sensitive to a temperature of the heat sink 20. As the temperature of the heat sink 20 increases, the resistance of the negative temperature coefficient thermistor array 48 decreases. As the temperature of the heat sink 20 decreases, the resistance of the negative temperature coefficient thermistor array 48 increases. Accordingly, the flow of current to the fan 24 is dependent on the temperature of the heat sink 20 as a negative feedback in the control loop. The negative temperature coefficient thermistor array 48 generally functions in manner as described in U.S. Pat. No. 8,070,324 which issued on Dec. 6, 2011 to Kornitz et al., and the full disclosure of which is incorporated herein by reference.

The thermal control circuit 32 also includes a resistor array 50 which is electrically connected in series between the negative terminal 40 of the LED array 18 and the negative terminal 44 of the DC power supply 12, through a switching power diode 52 and the first terminal 34 and the third terminal 38 of the thermal control circuit 32. The resistor array 50 functions to restrict the current flowing to the LED array 18 if the LED array 18 overheats and may make the fixture more energy efficient. The positive temperature coefficient thermistor array 46, the negative temperature coefficient thermistor array 48, and the resistor array 50 are electrically connected to a common negative bus 54.

There may be a resistor 56 and an indicator in the form of a light-emitting diode 58 electrically connected in series between a cathode of the switching power diode 52 and the common negative bus 54. The resistor 56 is electrically connected to an anode of the light-emitting diode 58 and a cathode of the light-emitting diode 58 is electrically connected to the negative bus 54. The resistor 56 may be a setting resistor and may function as a setting device of the light-emitting diode 58. The light emitting diode 58 may function as an indicator of the regime of the fixture. The negative terminal 40 of the LED array 18 is electrically connected with an anode of the switching power diode 52. A cathode of the switching power diode 52 is electrically connected with the resistor array 50 and the resistor 56.

Figure 5:
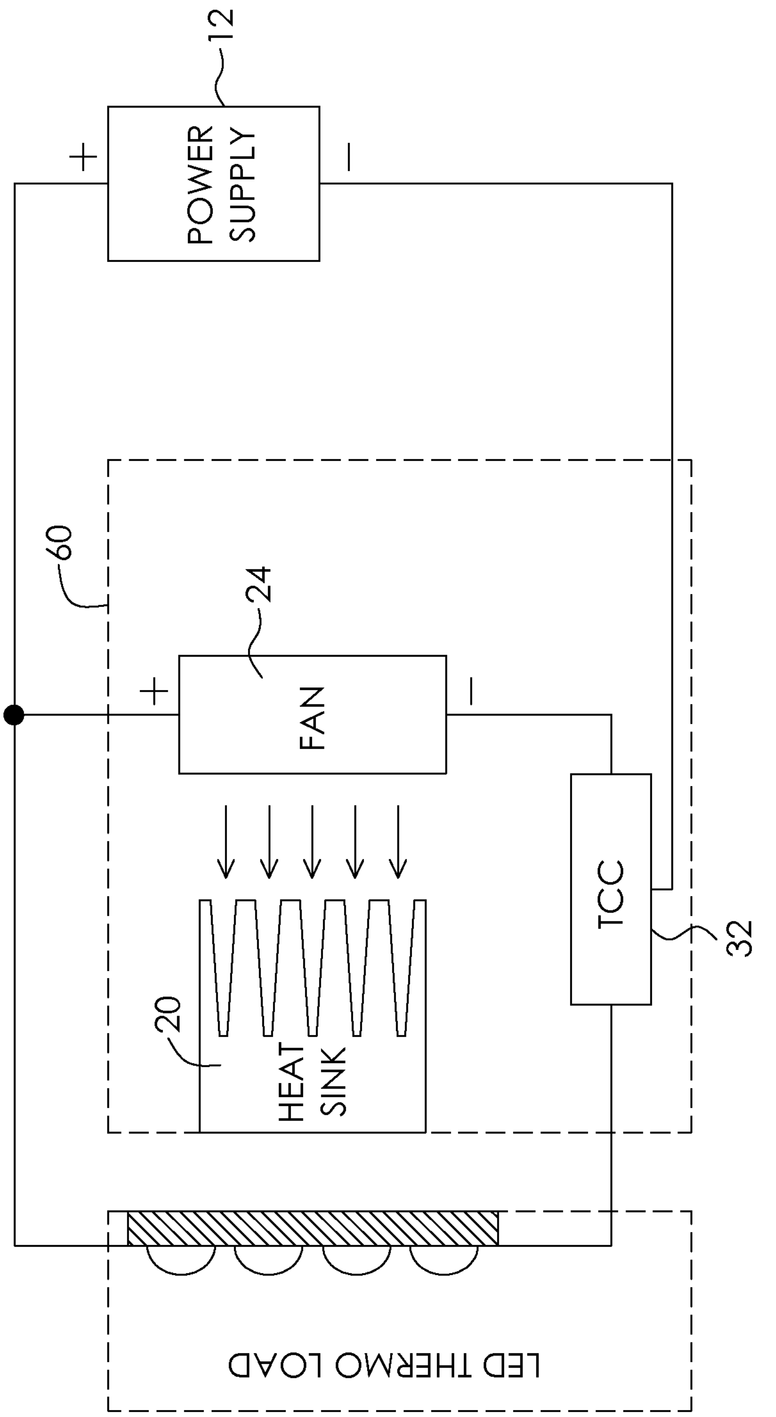
FIG. 5 is a simplified circuit diagram of the active cooling module.

Together the heat sink 20, the fan 24 and the thermal control circuit 32 form an active cooling module 60 which is shown in FIG. 5.

It will be understood by a person skilled in the art that the improved thermal control circuit disclosed herein may be used as part of an active cooling module for any electrical device including a light-emitting diode.

It will be understood by a person skilled in the art that many of the details provided above are by way of example only, and are not intended to limit the scope of the invention which is to be determined with reference to the following claims.

What is claimed is:

1. A thermal control circuit comprising:

a positive temperature coefficient thermistor array;

a negative temperature coefficient thermistor array; and a resistor array, wherein the positive temperature coefficient thermistor array and the resistor array are electrically connected in parallel to a first terminal of the thermal control circuit; the negative temperature coefficient thermistor array is electrically connected to a second terminal of the thermal control circuit; and the positive temperature coefficient thermistor array, the negative temperature coefficient thermistor array and the resistor array are all connected by a negative bus to a third terminal of the thermal control circuit.

2. The thermal control circuit as claimed in claim 1 wherein the thermal control circuit is a package.

3. An active cooling module for a light-emitting diode, the active cooling module comprising:

a cooling device electrically connected to a power supply; and a thermal control circuit electrically connected to the power supply, the thermal control circuit including:

a positive temperature coefficient thermistor array;

a negative temperature coefficient thermistor array; and a resistor array, wherein the positive temperature coefficient thermistor array and the resistor array are electrically connected in parallel to a first terminal of the thermal control circuit; the negative temperature coefficient thermistor array is electrically connected to a second terminal of the thermal control circuit; and the positive temperature coefficient thermistor array, the negative temperature coefficient thermistor array and the resistor array are all connected by a negative bus to a third terminal of the thermal control circuit;

wherein a negative terminal of the light-emitting diode is electrically connected the first terminal of the thermal control circuit, a negative terminal of the cooling device is electrically connected to the second terminal of the thermal control circuit, and a negative terminal of the power supply is electrically connected to the third terminal of the thermal control circuit.

4. The active cooling module as claimed in claim 3 further including a heat sink and wherein the light-emitting diode is thermally coupled to the heat sink.

5. The active cooling module as claimed in claim 4 wherein the thermal control circuit is mounted on the heat sink.

6. The active cooling module as claimed in claim 3 wherein the thermal control circuit is a package.

7. The active cooling module as claimed in claim 3 wherein the cooling device is a fan.

8. The active cooling module as claimed in claim 3 wherein the light-emitting diode is part of an LED array.

9. An electronic device provided with an active cooling module, the electrical device comprising:

a power supply;

a light-emitting diode electrically connected to the power supply;

a cooling device electrically connected to the power supply; and a thermal control circuit electrically connected to the power supply, the thermal control circuit including:

a positive temperature coefficient thermistor array;

a negative temperature coefficient thermistor array; and a resistor array, wherein the positive temperature coefficient thermistor array and the resistor array are electrically connected in parallel to a first terminal of the thermal control circuit; the negative temperature coefficient thermistor array is electrically connected to a second terminal of the thermal control circuit; and the positive temperature coefficient thermistor array, the negative temperature coefficient thermistor array and the resistor array are all connected by a negative bus to a third terminal of the thermal control circuit;

wherein a negative terminal of the light-emitting diode is electrically connected the first terminal of the thermal control circuit, a negative terminal of the cooling device is electrically connected to the second terminal of the thermal control circuit, and a negative terminal of the power supply is electrically connected to the third terminal of the thermal control circuit.

10. The electronic device as claimed in claim 9 further including a printed circuit board wherein the light-emitting diode and the thermal control circuit are mounted on the printed circuit board.

11. The electronic device as claimed in claim 9 further including a heat sink and wherein the light-emitting diode is thermally coupled to the heat sink

12. The electronic device as claimed in claim 11 wherein the thermal control circuit is mounted on the heat sink.

13. The electronic device as claimed in claim 9 wherein the thermal control circuit is a package.

14. The electronic device as claimed in claim 9 wherein the cooling device is a fan.

15. The electronic device as claimed in claim 9 wherein the light-emitting diode is part of an LED array.

16. The electronic device as claimed in claim 9 wherein the electronic device is a light-emitting diode fixture.

* * * * *